(12) United States Patent
Arihara et al.

(10) Patent No.: US 10,627,661 B2
(45) Date of Patent: Apr. 21, 2020

(54) LIQUID CRYSTAL DISPLAY DEVICE

(71) Applicant: PANASONIC INTELLECTUAL PROPERTY MANAGEMENT CO., LTD., Osaka (JP)

(72) Inventors: Tsutomu Arihara, Kanagawa (JP); Masami Yoda, Kanagawa (JP); Kohsuke Masuda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/315,211

(22) PCT Filed: Jun. 22, 2017

(86) PCT No.: PCT/JP2017/023007
§ 371 (c)(1),
(2) Date: Jan. 4, 2019

(87) PCT Pub. No.: WO2018/008419
PCT Pub. Date: Jan. 11, 2018

(65) Prior Publication Data
US 2019/0155090 A1     May 23, 2019

(30) Foreign Application Priority Data
Jul. 7, 2016   (JP) ................. 2016-135328

(51) Int. Cl.
*G02F 1/1333* (2006.01)
*G09F 9/30* (2006.01)
(Continued)

(52) U.S. Cl.
CPC ...... *G02F 1/133308* (2013.01); *G02F 1/1333* (2013.01); *G02F 1/13452* (2013.01);
(Continued)

(58) Field of Classification Search
CPC ................................. G02F 1/133308
See application file for complete search history.

(56) References Cited

U.S. PATENT DOCUMENTS

| 6,639,589 B1 | 10/2003 | Kim et al. |
| 2009/0201443 A1 | 8/2009 | Sasaki et al. |

(Continued)

FOREIGN PATENT DOCUMENTS

| JP | 2000-356783 A | 12/2000 |
| JP | 2009-042565 A | 2/2009 |

OTHER PUBLICATIONS

International Search Report issued in International Bureau of WIPO Patent Application No. PCT/JP2017/023007, dated Aug. 15, 2017.

*Primary Examiner* — Edmond C Lau
(74) *Attorney, Agent, or Firm* — Greenblum & Bernstein, P.L.C.

(57) ABSTRACT

A liquid crystal display device includes a cover member having a curved-surface shape and having a curved display surface, a liquid crystal panel having a GIP structure and disposed on a rear side of the cover member, and an adhesive layer interposed between the cover member and the liquid crystal panel. The liquid crystal panel includes a display area, and an IC mounting area adjacent to the display area. A gate drive circuit is mounted in the IC mounting area. The display area includes a first end adjacent to the IC mounting area, and a second end opposite the first end. In a curve in a direction from the first end to the second end, a first curvature at the first end is less than a second curvature at the second end.

4 Claims, 4 Drawing Sheets

(51) Int. Cl.
*G09F 9/00* (2006.01)
*G02F 1/1345* (2006.01)
(52) U.S. Cl.
CPC ............... *G09F 9/00* (2013.01); *G09F 9/30* (2013.01); *G02F 2001/133331* (2013.01); *G02F 2201/56* (2013.01); *G02F 2202/28* (2013.01)

(56) References Cited

U.S. PATENT DOCUMENTS

2013/0271957 A1* 10/2013 Etienne ............. G02F 1/133308
 362/97.1
2015/0154898 A1* 6/2015 Jung ........................ G09G 3/20
 345/206

* cited by examiner

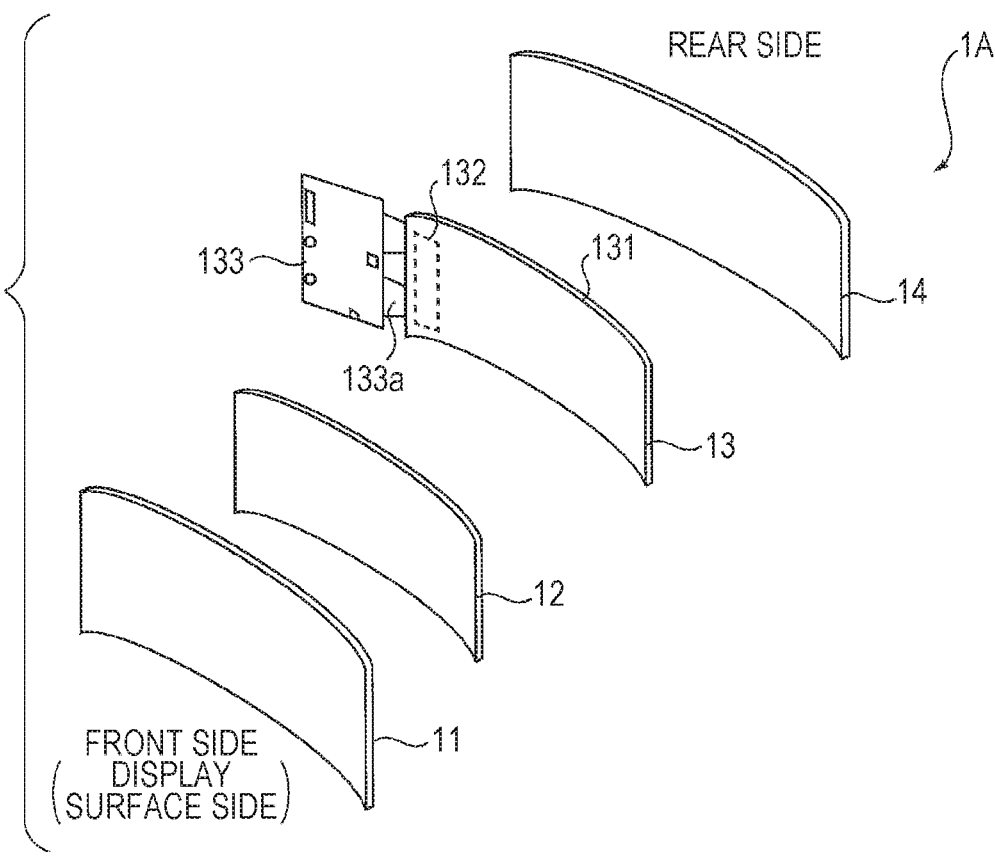

FIRST PORTION 11a          SECOND PORTION 11b

LIQUID CRYSTAL DISPLAY DEVICE

This application is a U.S. National Stage Application of the PCT International Application No. PCT/JP2017/023007 filed on Jun. 22, 2017, which claims the benefit of foreign priority of Japanese patent application 2016-135328 filed on Jul. 7, 2016, the contents all of which are incorporated herein by reference.

TECHNICAL FIELD

The present invention relates to a liquid crystal display device having a display surface with a curved-surface shape.

BACKGROUND ART

In recent years, from the viewpoint of design features, there has been a demand for liquid crystal display devices including a liquid crystal panel that has a concavely or convexly curved-surface shape (hereinafter referred to as a "curved-surface liquid crystal panel"). Such liquid crystal display devices have been put to practical use (PTL 1, for example). PTL 1 discloses a curved-surface liquid crystal panel formed by combining positive and negative curvatures in one direction.

As the use of car navigation systems has become widespread, and electronic mirrors have been replacing rearview and other mirrors, liquid crystal display devices have been widely used in automotive applications as well (see liquid crystal display devices D in FIG. 1). A curved-surface liquid crystal panel is useful for inhibiting reduction in visibility caused by the display size or the installation site in the vehicle interior because the distance from a point of view (eyes) is adjustable by the curved-surface shape.

For the curved-surface liquid crystal panel, a liquid crystal panel including, for example, a gate drive circuit, that is, with a so-called "gate-in-panel structure" (which will be hereinafter referred to as a "GIP structure") is suited. In the liquid crystal panel having the GIP structure, a glass substrate extends outwardly beyond a display area at one side (a shorter side, for example) of the liquid crystal panel. The gate drive circuit is mounted in this extended area (which will be hereinafter referred to as an "integrated circuit (IC) mounting area"). In the following description, the side of the liquid crystal panel near the IC mounting area will be referred to as an "IC mounting side", whereas a side of the liquid crystal panel opposite the IC mounting side will be referred to as an "IC non-mounting side".

CITATION LIST

Patent Literature

PTL 1: Unexamined Japanese Patent Publication No. 2009-42565

SUMMARY OF THE INVENTION

The present invention provides a liquid crystal display device having a display surface which has a curved-surface shape and for which a liquid crystal panel with the GIP structure is employed. The liquid crystal display device is capable of suppressing variations in brightness in the display area.

A liquid crystal display device according to the present invention includes a cover member having a curved-surface shape and having a curved display surface, a liquid crystal panel having a GIP structure and disposed on a rear side of the cover member, and an adhesive layer interposed between the cover member and the liquid crystal panel. The liquid crystal panel includes a display area, and an IC mounting area adjacent to the display area. A gate drive circuit is mounted in the IC mounting area. The display area includes a first end adjacent to the IC mounting area, and a second end opposite the first end. In a curve in a direction from the first end to the second end, a first curvature at the first end is less than a second curvature at the second end.

According to the present invention, variations in brightness in the display area are suppressed in the liquid crystal display device having the display surface which has the curved-surface shape and for which the liquid crystal panel with the GIP structure is employed.

BRIEF DESCRIPTION OF DRAWINGS

FIG. 3 is an exploded perspective view of the liquid crystal display device according to the first exemplary embodiment.

DESCRIPTION OF EMBODIMENTS

Prior to describing exemplary embodiments of the present invention, an issue concerning a conventional technique will be discussed briefly.

Curved-surface liquid crystal panels are known to have variations in brightness in their display area occurring due to leakage of light when displaying an image having a low grayscale value. This is particularly noticeable in a liquid crystal panel using in-place-switching (IPS) technology. Such variations in brightness are proportional to a stress generated in the liquid crystal panel when the curved-surface shape is formed. The variations in brightness are usually suppressed by distributing the stress generated in the liquid crystal panel or by applying a load to offset the stress.

In a curved-surface liquid crystal panel having the GIP structure, however, variations in brightness in the display area tend to be more severe at the IC mounting side than at the IC non-mounting side. This is because the IC mounting area extends from the display area at the IC mounting side, causing a greater stress to be generated in the display area at the IC mounting side than at the IC non-mounting side. It is thus difficult to suppress variations in brightness in the display area at the IC mounting side in the same manner as variations in brightness in the display area at the IC non-mounting side.

The exemplary embodiments of the present invention will be described in detail below with reference to the drawings.

First Exemplary Embodiment

Figure 2:
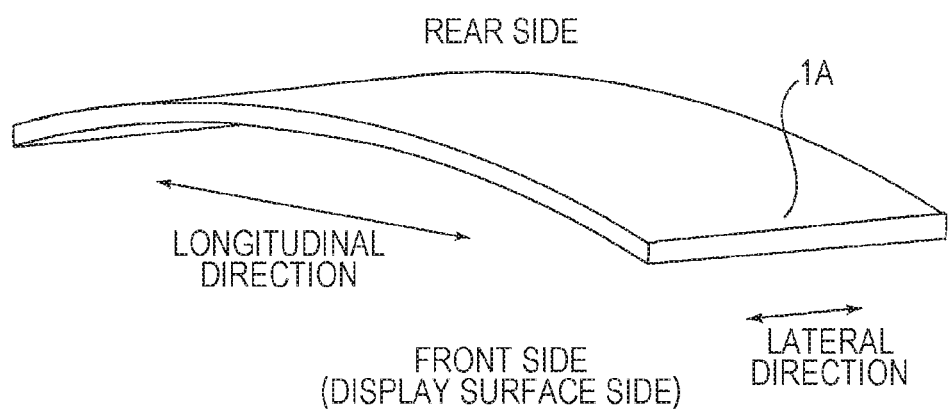
FIG. 2 is a perspective view of a liquid crystal display device according to a first exemplary embodiment.
Figure 4A:
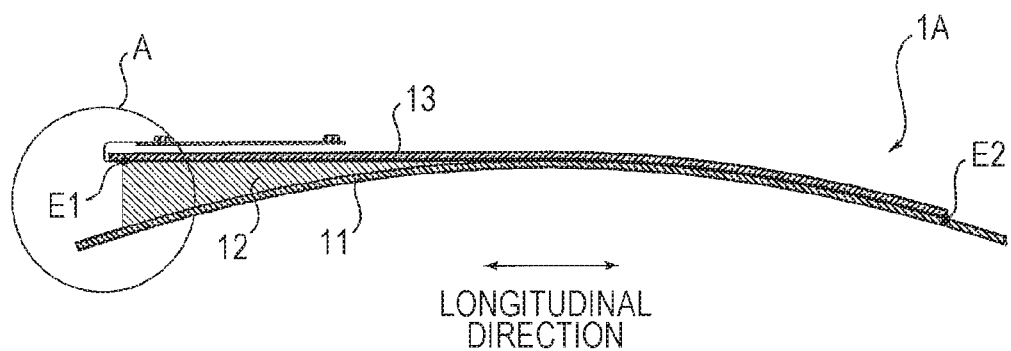
FIG. 4A is a longitudinal cross-sectional view of the liquid crystal display device according to the first exemplary embodiment.
Figure 4B:
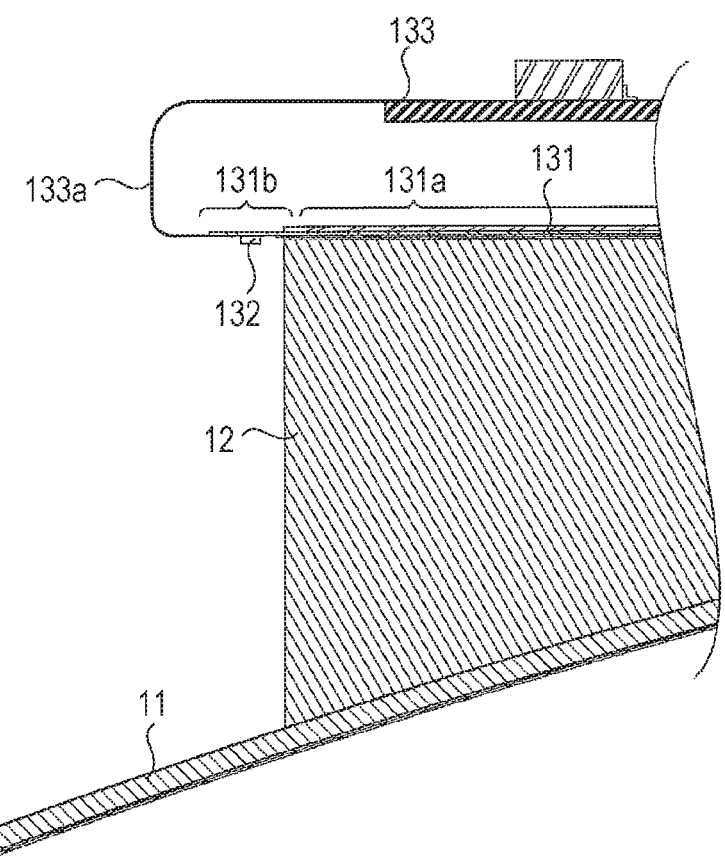
FIG. 4B is an enlarged view of region A shown in FIG. 4A.

FIG. 2 illustrates liquid crystal display device 1A according to a first exemplary embodiment of the present invention. FIG. 3 is an exploded perspective view of liquid crystal display device 1A. FIGS. 4A and 4B are longitudinal cross-sectional views of liquid crystal display device 1A. FIG. 4B is an enlarged view of region A shown in FIG. 4A. In FIGS. 4A and 4B, backlight 14 is omitted.

Figure 1:
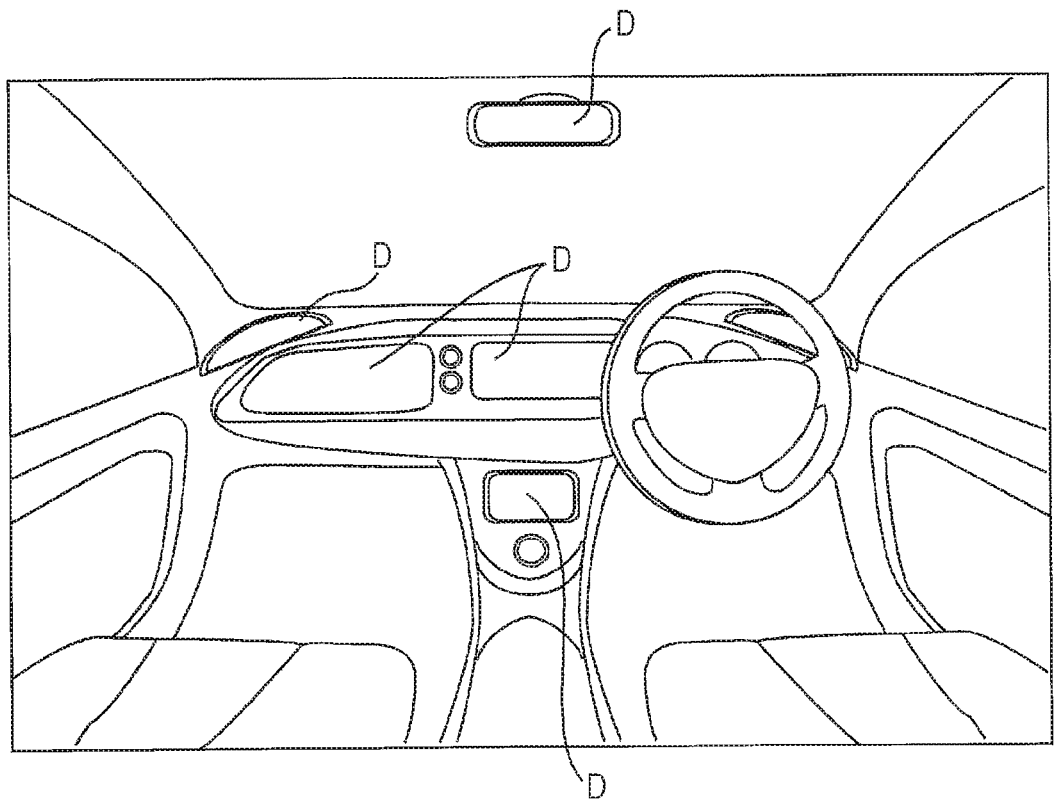
FIG. 1 illustrates an example arrangement of liquid crystal display devices in a vehicle interior.

Liquid crystal display device 1A is a vehicle-mounted liquid crystal display device applied to a vehicle instrument panel, for example (see liquid crystal display devices D in FIG. 1). As illustrated in FIGS. 2 to 4B, liquid crystal display device 1A includes cover member 11, adhesive layer 12, liquid crystal panel 13, and backlight 14 in this order from a front side (a display surface side). These components are held by a frame (not shown).

Cover member 11 is formed of, for example, a glass material or a resin material, such as acrylic, and has a rectangular shape in plan view. Cover member 11 has a curved-surface shape, which is curved along a longitudinal direction. Specifically, cover member 11, as a whole, is concavely curved along the longitudinal direction toward the front side, and is symmetric with respect to a center in the longitudinal direction. Cover member 11 forms a display surface of liquid crystal display device 1.

Adhesive layer 12 bonds liquid crystal panel 13 to cover member 11. To be specific, so-called "direct bonding" is employed in liquid crystal display device 1. Adhesive layer 12 is formed of an optically clear adhesive (OCA) or an optically clear resin (OCR), for example.

Liquid crystal panel 13 includes panel body 131, gate drive circuit 132, and printed wiring board 133. Liquid crystal panel 13 is bonded to cover member 11 with adhesive layer 12 interposed between liquid crystal panel 13 and cover member 11. Most of liquid crystal panel 13 is curved along the curved-surface shape of cover member 11. Panel body 131 includes, for example, a liquid crystal layer, two glass substrates (including an oriented film, a transparent electrode, and a color filter) holding the liquid crystal layer, and two polarizing plates disposed on outer sides of the glass substrates (none of which are shown).

Panel body 131 has display area 131a and IC mounting area 131b. IC mounting area 131b extends from an end, in the longitudinal direction, of the glass substrates (not shown), that is, from display area 131a, to a shorter side. Gate drive circuit 132 is disposed in IC mounting area 131b. That is, liquid crystal panel 13 is a liquid crystal panel having a GIP structure.

In panel body 131, an end of display area 131a adjacent to IC mounting area 131b will be referred to as "first end E1", and an end of display area 131a opposite first end E1 will be referred to as "second end E2".

Printed wiring board 133 is electrically connected to panel body 131 and gate drive circuit 132 through flexible printed board 133a. Printed wiring board 133 includes a display drive circuit (not shown) that controls operation of panel body 131 and gate drive circuit 132. By bending flexible printed board 133a, printed wiring board 133 is wrapped around to a rear side of panel body 131 and secured to a rear frame (not shown).

The display drive circuit (not shown) provides on/off control of voltage to be applied to the transparent electrode of panel body 131 to change orientation of liquid crystal molecules and thereby controls transmission of light. Light that has passed through the polarizing plates forms a display image.

Backlight 14 is an edge-lit surface-emitting device, for example, that emits light to liquid crystal panel 13 (panel body 131) from behind. Backlight 14 of the "edge-lit" type includes a reflecting plate, a light guiding panel (LGP), an optical sheet, and a light source that emits light to an end face of the light guiding panel.

The light guiding panel is a plate-shaped member made of polycarbonate or polymethyl methacrylate (PMMA), for example. The light guiding panel diffuses the incoming light entering from the light source through the end face and emits the diffused light uniformly to the front side. The reflecting plate reflects, toward the front side, light leaking from the light guiding panel to the rear side. The optical sheet includes a diffusion sheet or a prism sheet, for example, and diffuses the light emitted from the light guiding panel. The reflecting plate, the light guiding panel, and the optical sheet are similar in shape to liquid crystal panel 13, and are disposed in parallel with liquid crystal panel 13.

In the present exemplary embodiment, as illustrated in FIGS. 4A and 4B, adhesive layer 12 has a non-uniform thickness, which gradually increases from the center in the longitudinal direction toward first end E1. Specifically, the thickness of adhesive layer 12 is adjusted in such a manner that a part of panel body 131 extending from the center in the longitudinal direction to first end E1 is flat (curvature=0). A local curvature at first end E1 (which will be hereinafter referred to as a "first curvature") is zero, and is naturally less than a curvature of cover member 11.

On the other hand, a part of adhesive layer 12 corresponding to a part of panel body 131 extending from the center in the longitudinal direction to second end E2 has a uniform thickness. A local curvature at second end E2 (which will be hereinafter referred to as a "second curvature") is equal to the curvature of cover member 11.

That is, in the first exemplary embodiment, the thickness of adhesive layer 12 is adjusted in such a manner that the first curvature at first end E1 is less than the second curvature at second end E2. Accordingly, when panel body 131 is formed into the curved-surface shape, a stress generated at first end E1 is less than a stress generated at second end E2. In the present exemplary embodiment, since the first curvature at first end E1 is zero, no stress is generated in the flat part including first end E1.

Therefore, variations in brightness in a part of the display area including first end E1 are smaller than variations in brightness in a part of the display area including second end E2. Furthermore, any variations in brightness occurring in the part of the display area including first end E1 are eliminated in the same way as variations in brightness occurring near second end E2.

If a panel body has a curved-surface shape on its rear side as in conventional curved-surface liquid crystal panels, a rear frame (not shown) disposed on the rear side of the panel body also has a curved-surface shape. Thus, curved surface tolerance needs to be taken into consideration in securing a flat printed wiring board. For example, the following technique is employed. Specifically, a spacer that absorbs curved surface tolerance is interposed between the rear frame and the printed wiring board to form a flat securement surface. The printed wiring board is bonded to the securement surface with double-sided adhesive tape, for example.

In contrast, in the present exemplary embodiment, the rear side of the part of panel body 131 where printed wiring board 133 is disposed is flat (or has a curved-surface shape having a very low curvature). Naturally, the securement surface of the rear frame for printed wiring board 133 is also flat. Accordingly, when printed wiring board 133 is secured to the rear frame, there is no need for consideration of curved surface tolerance, thereby simplifying the design. Also, since printed wiring board 133 is directly secured to the rear frame, printed wiring board 133 is easily and firmly secured by caulking.

In this way, liquid crystal display device 1A according to the first exemplary embodiment includes cover member 11 having a curved-surface shape and having a curved display surface, liquid crystal panel 13 having a GIP structure and disposed on the rear side of cover member 11, and adhesive layer 12 interposed between cover member 11 and liquid crystal panel 13. Liquid crystal panel 13 includes display area 131a, and IC mounting area 131b adjacent to display area 131a. The gate drive circuit is mounted in IC mounting area 131b. Display area 131a includes first end E1 adjacent to IC mounting area 131b, and second end E2 opposite first end E1. In the curve in the direction from first end E1 to second end E2, the first curvature at the first end is less than the second curvature at the second end.

In liquid crystal display device 1A, most of liquid crystal panel 13 has the curved-surface shape, while IC mounting area 131b is formed to have the almost flat shape. This configuration reduces a stress generated in the display area near IC mounting area 131b, thereby suppressing variations in brightness in display area 131a.

Second Exemplary Embodiment

Figure 5A:
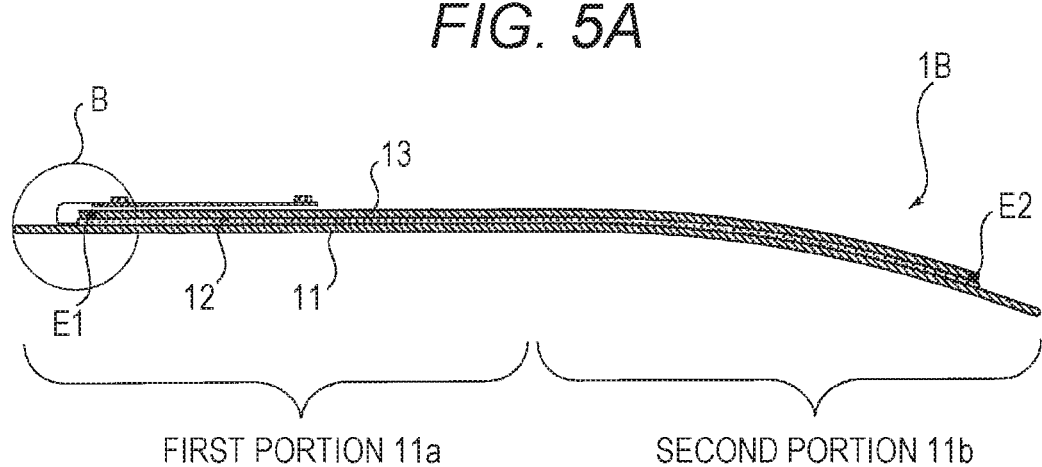
FIG. 5A is a longitudinal cross-sectional view of a liquid crystal display device according to a second exemplary embodiment.
Figure 5B:
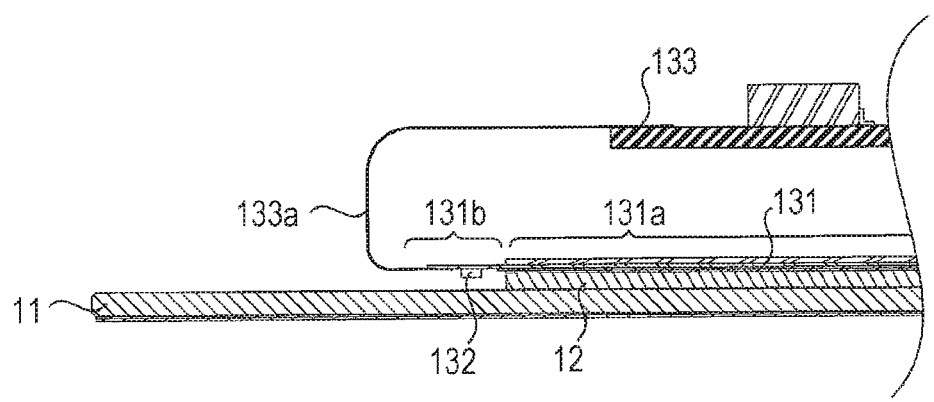
FIG. 5B is an enlarged view of region B shown in FIG. 5A.

FIGS. 5A and 5B are longitudinal cross-sectional views of liquid crystal display device 1B according to a second exemplary embodiment of the present invention. FIG. 5B is an enlarged view of region B shown in FIG. 5A. In FIGS. 5A and 5B, backlight 14 is omitted. Components identical or corresponding to the components of the first exemplary embodiment are denoted by the same reference numerals, and descriptions of such components are omitted.

As in the first exemplary embodiment, liquid crystal display device 1B includes cover member 11, adhesive layer 12, liquid crystal panel 13, and backlight 14 in this order from a front side (a display surface side). These components are held by a frame (not shown).

Cover member 11 has a rectangular shape in plan view and has a curved-surface shape, which is curved along a longitudinal direction, as in the first exemplary embodiment. Cover member 11, however, is asymmetric with respect to a center in the longitudinal direction. To be specific, in the second exemplary embodiment, cover member 11 includes first portion 11a having a flat shape, and second portion 11b having a curved-surface shape.

In cover member 11, first portion 11a only needs to have a curvature lower than a curvature of second portion 11b. However, preferably, first portion 11a of cover member 11 is almost flat.

Adhesive layer 12 is formed on a rear side of cover member 11 to have a uniform thickness. Liquid crystal panel 13 is disposed in parallel with cover member 11 in such a manner that first end E1 adjacent to IC mounting area 131b corresponds to first portion 11a of cover member 11, while second end E2 opposite first end E1 corresponds to second portion 11b.

Hence, when panel body 131 is formed into a curved-surface shape, a stress generated at first end E1 is less than a stress generated at second end E2. In the present exemplary embodiment, a first curvature at first end E1 is zero, and thus no stress is generated in the flat part including first end E1.

Therefore, variations in brightness in a part of the display area including first end E1 are smaller than variations in brightness in a part of the display area including second end E2. Furthermore, any variations in brightness occurring in the part of the display area including first end E1 are eliminated in the same way as variations in brightness occurring near second end E2. Also, as in the first exemplary embodiment, printed wiring board 133 is directly secured to a rear frame, and is thus easily and firmly secured by caulking.

Like liquid crystal display device 1A according to the first exemplary embodiment, liquid crystal display device 1B according to the second exemplary embodiment includes cover member 11 having a curved-surface shape and having a curved display surface, liquid crystal panel 13 having a GIP structure and disposed on the rear side of cover member 11, and adhesive layer 12 interposed between cover member 11 and liquid crystal panel 13. Liquid crystal panel 13 includes display area 131a, and IC mounting area 131b adjacent to display area 131a. A gate drive circuit is mounted in IC mounting area 131b. Display area 131a includes first end E1 adjacent to IC mounting area 131b, and second end E2 opposite first end E1. In the curve in the direction from first end E1 to the second end, the curvature at first end E1 is less than the second curvature at second end E2.

In liquid crystal display device 1B, most of liquid crystal panel 13 has the curved-surface shape, while IC mounting area 131b is formed to have the flat shape. This configuration reduces a stress generated in the display area near IC mounting area 131b, thereby suppressing variations in brightness in display area 131a.

Although the invention made by the present inventors has been specifically described above based on the exemplary embodiments, the present invention is not limited to the above exemplary embodiments, but can be modified without departing from the gist of the present invention.

According to the present invention, in liquid crystal panel 13, the first curvature at first end E1 adjacent to IC mounting area 131b only needs to be less than the second curvature at second end E2 opposite first end E1. The method to achieve this is not limited to what described in the exemplary embodiments. For example, the curvature at first end E1 may be adjusted by adjusting the thickness of cover member 11 and the components (such as polarizing plates) of panel body 131.

It should be construed that the exemplary embodiments disclosed herein are illustrative in all aspects, and are not restrictive. The scope of the present invention is represented by the scope of the claims and not by the above description, and it is intended that all modifications within the sense and scope equivalent to the claims are involved in the scope of the present invention.

INDUSTRIAL APPLICABILITY

A liquid crystal display device according to the present invention is suitably applied to a liquid crystal display device having a display surface with a curved-surface shape.

REFERENCE MARKS IN THE DRAWINGS 1, 1A, 1B, D: liquid crystal display device
11: cover member
11a: first portion
11b: second portion
12: adhesive layer
13: liquid crystal panel
131: panel body
131a: display area
131b: IC mounting area E1: first end
E2: second end
132: gate drive circuit
133: printed wiring board
133a: flexible printed board
14: backlight

The invention claimed is:

1. A liquid crystal display device comprising:
a cover member having a curved display surface, a first portion having a curved-surface shape, and a second portion having a curvature less than a curvature of the first portion;
a liquid crystal panel having a gate-in-panel structure and disposed in parallel with and on a rear side of the cover member in such a manner that the first end corresponds to the second portion, and the second end corresponds to the first portion; and
an adhesive layer interposed between the cover member and the liquid crystal panel, wherein
the liquid crystal panel includes a display area, and an integrated circuit (IC) mounting area adjacent to the display area, a gate drive circuit being mounted in the IC mounting area,
the display area includes a first end adjacent to the IC mounting area, and a second end opposite the first end, and
in a curve in a direction from the first end to the second end, a first curvature at the first end is less than a second curvature at the second end.

2. The liquid crystal display device according to claim 1, wherein the first curvature at the first end is zero.

3. The liquid crystal display device according to claim 1, wherein
the cover member, as a whole, is curved with a predetermined curvature, and
the adhesive layer has a thickness adjusted in such a manner that the first curvature is less than the second curvature.

4. The liquid crystal display device according to claim 1, further comprising a printed wiring board including a display drive circuit that controls operation of the liquid crystal panel and the gate drive circuit,
wherein the printed wiring board is secured to a rear side of the liquid crystal panel near the IC mounting area.

* * * * *